United States Patent [19]

Koga

[11] Patent Number: 4,727,421
[45] Date of Patent: Feb. 23, 1988

[54] METHOD OF CODING PICTURE SIGNAL AND PICTURE CODING/DECODING APPARATUS UTILIZING THE SAME

[75] Inventor: Toshio Koga, Tokyo, Japan

[73] Assignee: NEC Corporation, Japan

[21] Appl. No.: 783,198

[22] Filed: Oct. 2, 1985

[30] Foreign Application Priority Data

Oct. 4, 1984 [JP] Japan .............................. 59-208624
Oct. 4, 1984 [JP] Japan .............................. 59-208625

[51] Int. Cl.[4] .......................... H04N 7/12; H04N 7/18; H04N 1/419
[52] U.S. Cl. .................................. 358/133; 358/105; 358/261
[58] Field of Search ................. 358/105, 133, 136, 261

[56] References Cited

U.S. PATENT DOCUMENTS

| 4,409,623 | 10/1983 | Kobayashi et al. | 358/261 |
| 4,418,409 | 11/1983 | Queen | 358/261 X |
| 4,460,923 | 7/1984 | Hirano et al. | 358/136 |
| 4,475,127 | 10/1984 | Iinuma | 358/261 X |

FOREIGN PATENT DOCUMENTS 160547 11/1985 European Pat. Off. ............ 358/105

OTHER PUBLICATIONS

"Digital Television Transmission Using Bandwidth Compression Techniques", by Hisashi Kaneko and Tatsuo Ishiguro, IEEE Communications Magazine, p. 14, (Jul. 1980).

Primary Examiner—E. A. Goldberg
Assistant Examiner—Patrick W. Foster
Attorney, Agent, or Firm—Ostrolenk, Faber, Gerb & Soffen

[57] ABSTRACT

A code conversion system for picture signals, e.g., television signals. In accordance with this system, an operation is made to select a coding parameter by using N scanning lines of the picture signal as a unit so as to encode the picture signal by using the coding parameter. When coding operations with respect to the picture signal carried out every N scanning lines are repeated in succession to provide the same coding result, an operation is made to encode a repetition number of the coding operations, thus providing a code conversion system suitable for a low transmission bit rate of picture signals. Particularly, this system is greatly practicable when applied to a predictive coding system.

13 Claims, 6 Drawing Figures

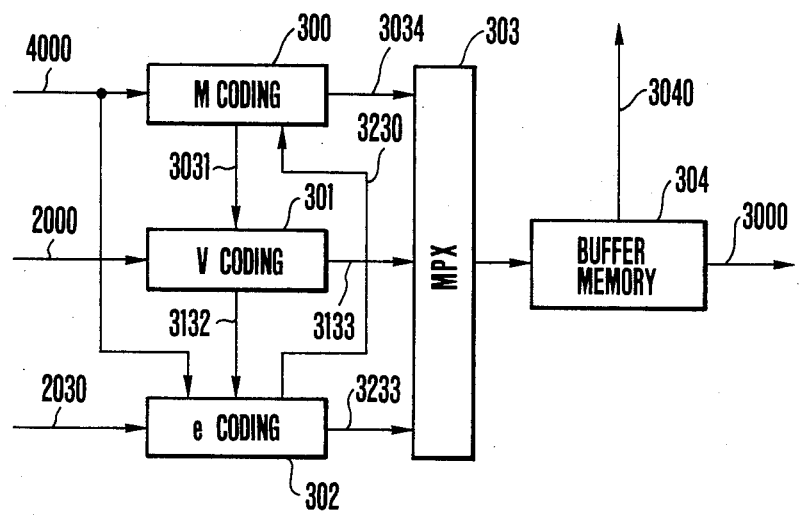
F I G. 3A
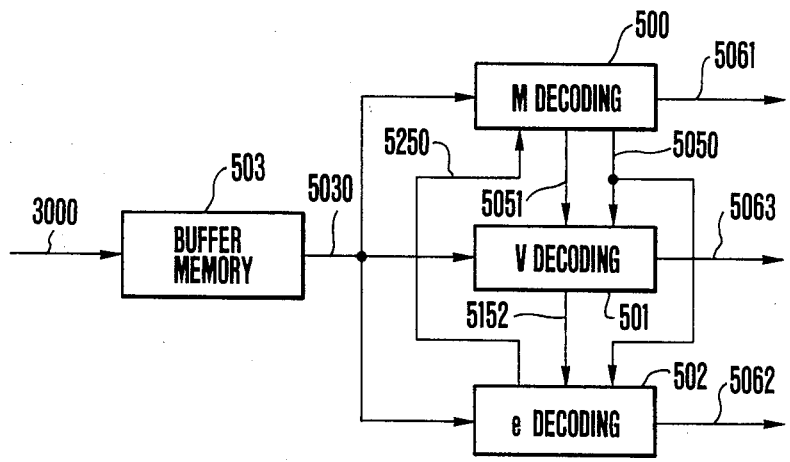
F I G. 3B

METHOD OF CODING PICTURE SIGNAL AND PICTURE CODING/DECODING APPARATUS UTILIZING THE SAME

BACKGROUND OF THE INVENTION

The present invention relates to a coding technology for use in transmitting picture signals.

Picture signals, especially, television signals which are typical motion picture signals, represent high correlation between frames i.e. high interframe correlation. By making use of this high interframe correlation, it is possible to reduce i.e. compress a large volume of information at the time of transmission. A system called "interframe predictive coding" is the simplest system among the methods of utilizing interframe correlation. See H. Kaneko and T. Ishiguro "Digital television transmission using bandwidth compression techniques", IEEE Communication Magazine, July 1980, pp. 14–22. With this system, the smaller the number of moving portions included in a frame, the greater the compression ratio becomes. However, when the extent of motion (area, or velocity etc.) is large, a large degree of compression cannot be expected. On the other hand, a "Motion-compensated interframe predictive coding system" has been proposed to always realize adaptively an optimum prediction with respect to moving portions, even when they are included, by utilizing a motion vector indicative of moving speed and direction of the moving portions. This motion-compensated interframe coding method makes it possible to realize a compression to a great extent even if moving portions are included in the frame. For instance, an example of the motion-compensated interframe coding system is described in U.S. Pat. No. 4,460,923 assigned to the same assignee as the present invention. This patent discloses a predictive coding system capable of remarkably improving coding efficiency especially where the transmission speed is low. In a code conversion which uses as small a quantity of codes as possible for expressing a prediction error or a motion vector obtained as a result of high efficiency predictive coding, and coding parameters or horizontal and vertical synchronizing signal etc. used in the predictive coding, a variable length code e.g. Huffman code etc. is often used.

Alternation of the coding parameter is not necessarily carried out every scanning line. Ordinarily, such alternation is effected with N scanning lines (N≧1), e.g., N=8 as a unit. Accordingly, it is convenient to effect coding conversion per N scanning lines. FIG. 1 schematically illustrates an example of a simple code conversion having a code sequence labelled B. As seen from this figure, the coding procedure comprises providing in succession a synchronizing code (e.g. zero of 8 bits) indicating that a vertical or horizontal synchronizing signal subsequently arrives, a line synchronizing code representative of horizontal synchronization of N scanning lines, a coding mode signal and a motion vector code signal, and coding a prediction error obtained when a predictive coding is effected by using the motion vector code signal and its coding mode signal, thus completing code conversion in regard to N scanning lines. The synchronizing code, the line synchronizing code and the coding mode signal have bit configuration of 8 bits, repsectively, and 24 bits are used in total for expressing these signals Assuming that a picture signal system has M scanning lines, 24×M/N bits per one frame are required. For instance, when M=525 and N=8, 1575 bits per one frame are required. In a system where 30 frames per second are indicated, the bit rate amounts up to 1575×30÷47 Kbps (bit per second), which corresponds to the fixed quantity of information ordinarily produced. Namely, even in the case where both the quantity of the motion vector and that of the prediction error represent negligible values nearly equal to zero, the rate at which information occurs is 47 Kpbs. Assuming now that the bit rate of a communication channel used in the transmission is 1.5 Mbps, the ratio of 47/1500÷1/30 is not so high. However, in the case where the bit rate of the communication channel lower than 1.5 Mbps, e.g., 500 Kbps is assumed, the ratio becomes 47/500÷1/10 which is considerably large in the occupation ratio. Accordingly, when transmitting a picture signal at a low transmission speed or bit rate, in the case where a motion vector and a prediction error are repeated in the same manner every N scanning lines under the same coding mode, a method which enables code conversion with a reduced quantity of codes is required.

SUMMARY OF THE INVENTION

With the above in view, an object of the present invention is to provide a code conversion system suitable for a low bit transmission rate of picture signals.

According to the present invention, there is provided a code conversion method for a picture signal wherein an operation is made to select a coding parameter by using N scanning lines (N is a positive integer) of the picture signal as a unit so as to encode the picture signal by using the coding parameter, the improvement wherein when coding operations with respect to the picture signal carried out every N scanning lines are repeated in succession to provide the same coding result, an operation is made to encode a repetition number of the coding operations.

According to the present invention, there is also provided an encoder for a picture signal comprising: code conversion means responsive to successive picture signals correlative with each other to apply a predetermined code conversion based on quantization to each picture signal so as to limit the output level of the picture signal on the basis of a quantization for selecting one of quantization characteristics in accordance with a coding parameter selected using N (integer: N≧1) scanning lines as a unit; first coding means operative to encode information indicative of the coding parameter every N scanning lines; second coding means operative to encode the picture signal outputted from the code conversion means every N scanning lines; judging means provided in the first coding means to judge as to whether an output of the first coding means is the same as that of immediately preceding N scanning lines to produce a coincidence signal when both the outputs are coincident with each other; third coding means, provided in the first coding means, being responsive to said coincident signal from the judging means to encode repetition number of the coding operations carried out evey N scanning lines; and multiplexer means operative to multiplex outputs from the first and second coding means or outputs from the first, second and third means depending upon the output status of the judging means.

According to the present invention, there is further provided a decoder for a picture signal, the decoder responsive to the picture signal coded so that its output level is limited to a predetermined range in accordance with a coding parameter selected using N scanning lines as a unit, wherein when coding operations with respect to the picture signal carried out every N scanning lines are repeated in succession, the coded picture signal includes a coded repetition number of the coding operations, the decoder comprising means responsive to information indicating the coding parameter, the picture signal and the number of the successive repetitive operations to separate them from each other, first decoding means operative to decode the coding parameter from the separating means, second decoding means operative to decode the coded picture signal from the separating means using an output from the first decoding means, and control means responsive to the information indicative of the coded number of the successive repetitive operations from the separating means, thus outputting a decoded picture signal from the second decoding means by the decoded repetition number of the coding operations.

BRIEF DESCRIPTION OF THE DRAWINGS

The features and advantages of a method of coding picture signal, and coding/decoding apparatus utilizing the same, according to the present invention will become more apparent from the following description taken in conjunction with the accompanying drawings, in which:

FIG. 3A is a block diagram illustrating an example of the variable length coding circuit 30 in the system shown in FIG. 2;

FIG. 3B is a block diagram illustrating an example of the variable length decoding circuit 50 in the system shown in FIG. 2;

DESCRIPTION OF THE PREFERRED EMBODIMENT PRINCIPLE OF THE INVENTION

Figure 1:
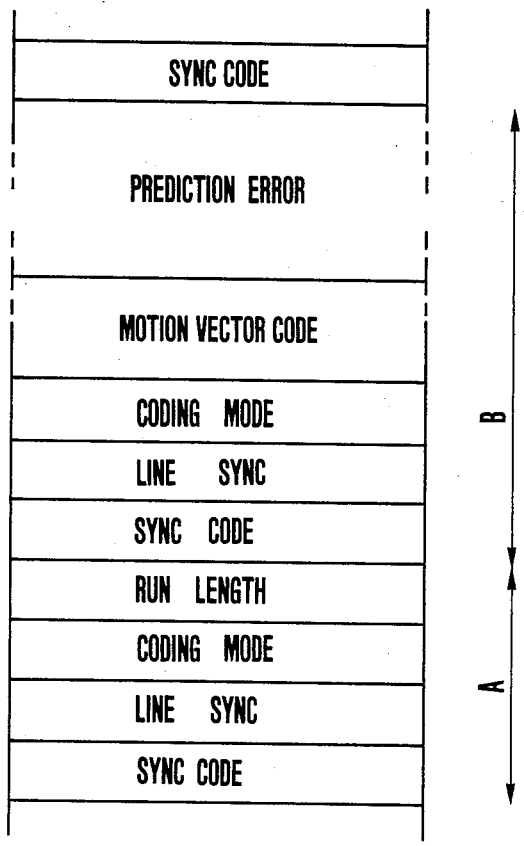
FIG. 1 shows an example of a code train employed in the present invention.

Initially, the principle of the present invention will be described with reference to FIG. 1. The code combination labelled B in FIG. 1 is based on the system which has been employed in the art as previously described. There are instances where loss occurs when the synchronizing code, the line synchronizing signal and the coding mode signal are always code-converted in a fixed manner and transmitted. In a case where the subsequent motion vector and prediction error can be expressed as a fixed repetition thereof, in general, as a repetition every N scanning lines under a certain coding mode signal, execution of code conversion every N scanning lines is redundant. In such a case, an operation is carried out which is effective to generate a code indicative of the subsequent repetition number after the code conversion is initially carried out based on the code combination B shown in FIG. 1, thereby making it possible to decode signals into states before they are not subject to the code conversion. Particularly, where the motion vectors and the prediction errors are all zero, viz., in a complete still or motionless condition, it is convenient to prepare a portion of the coding mode signal, e.g., 1 bit as a code for designating whether the present condition represents a complete still condition or not. Such a technique is indicated by A in FIG. 1. Namely, an operation is effected to express that the complete still condition is mode-converted by using 1 bit within the coding mode signal, subsequent to the synchronizing code and the line synchronization, and thereafter to add, subsequent to the coding mode signal, a code-converted repetition number m indicating that the status of the coding mode signal continues during $m \times N$ scanning lines. The added number m represents a run length in FIG. 1. Thus, when decoding, it is possible to effect a reproduction wherein the motion vector and the prediction error are zero with respect to the concerned $m \times N$ scanning lines under the coding parameter expressed by the coding mode signal at this time. The quantity of code required at this time per the concerned scanning lines is $(8 \times 4)/(m \times N)$ bits on the assumption that 8 bits are required for expressing the repetition number m. For instance, when $N=8$, the quantity of code is expressed by $4/m$ bits/scanning line. Where the entire frame is completely still, it is sufficient that $525/8 \div 65$ can be expressed as the repetition number m. For this reason, the repetition number m can be expressed still using 8 bits, with the result that $8 \times 4$ (bit/frame) is sufficient in the same manner. When compared with 1575 bits/frame according to the conventional method, the ratio of the quantity of codes in connection with both the cases is calculated by $32/1575 \div 1/49$. Thus, the system according to the present invention makes it possible to extremely reduce the quantity of code required for expressing the complete still condition by the same one frame.

Accordingly, when code conversion is effected in accordance with the present invention, the complete still portions are denoted by A in FIG. 1 and portions which are not completely still are denoted by B in FIG. 1. Ordinarily, code conversion of the picture signal is carried out with both portions A and B being mixed with each other.

The complete still condition described as an example is a condition actually occurring in the case of field repetition, which is a representative technique usually used when occurrence of information at the time of coding is excessive or in the case where coding is stopped. When transmission bit rate is low or a picture includes a sudden movement, the frequency of occurrence of the complete still condition is increased. When the entire frames are completely still, i.e., coding per one frame is stopped, a frame synchronization indicating the beginning of frame is inserted instead of the line sychronization labelled A shown in FIG. 1 to effect code conversion by using the above-mentioned m indicating 65 as a repetition number, thus making it possible to execute code conversion of the entire one frame.

PREFERRED EMBODIMENT

A preferred embodiment according to the present invention will be described with reference to FIGS. 2, 3, and 4.

Initially, encoder circuitry will be described.

Figure 2:
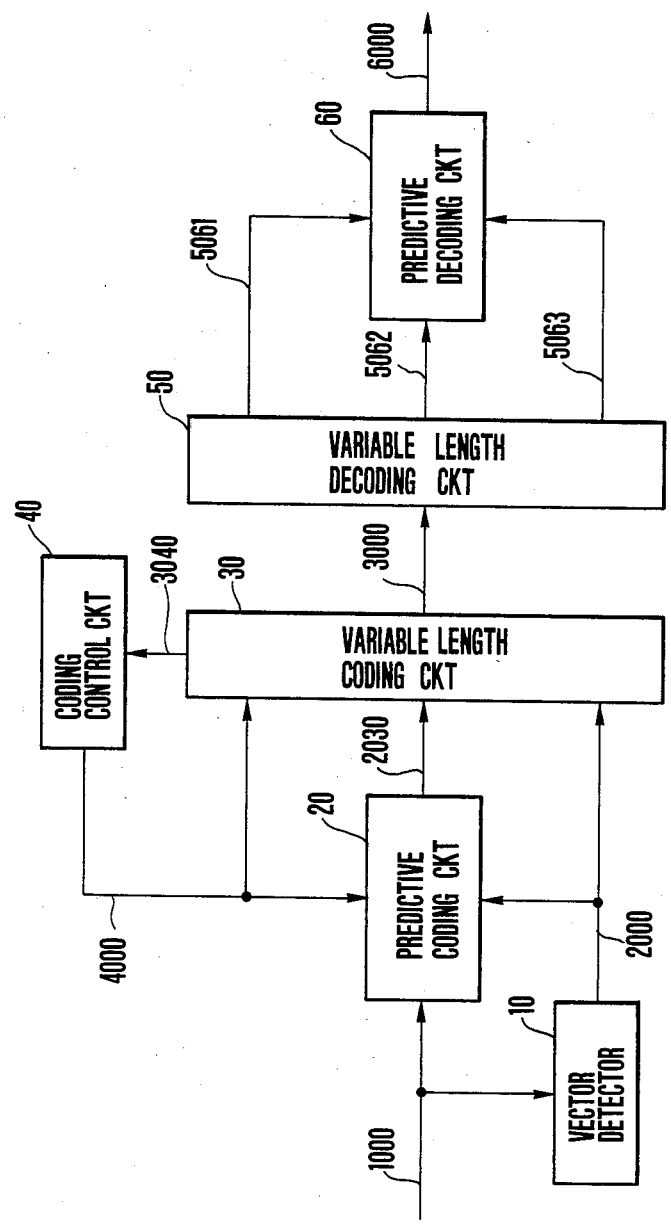
FIG. 2 is a block diagram schematically illustrating an embodiment of a coding/decoding system according to the present invention.

In FIG. 2, an input picture signal is supplied to a vector detection circuit 10 and a predictive coding circuit 20 via a line 1000. The vector detection circuit 10 is operative to detect speed and direction of a motion i.e. a motion vector within a frame, and deliver the motion vector to the predictive coding circuit 20 and a variable length coding circuit 30 via a line 2000. The predictive coding circuit 20 is operative to adaptively vary a delay time between successive frames in accordance with the motion indicated by the motion vector to produce a prediction signal, thus effecting a predictive coding using the prediction signal. A prediction error signal is fed to the variable length coding circuit 30 via a line 2030. The prediction error signal has been ordinarily subject to a process called "quantization" to limit the number of possible output levels. In accordance with the present invention, a plurality of quantization characteristics are predetermined. Then, an operation is carried out wherein one of the quantization characteristics is selected in accordance with a coding control signal delivered via a line 4000, to cause the predictive coding circuit to use the selected one. The coding control signal includes information instructing control e.g. dropping of picture element or scanning line or a repetition of frame of field etc. The coding control signal varies for each unit of N scanning lines. A coding control circuit 40 is operative to produce this coding control signal, by monitoring the occupancy of a buffer memory (designated by reference numeral 304 in FIG. 3A) incorporated in the variable length coding circuit 30. Such a coding control signal delivered via the line 4000 is code-converted in the variable length coding circuit 30.

The predictive coding circuit 20 does not necessarily produce a prediction signal corresponding to the motion vector. For instance, a prediction method constantly using the picture elements in a preceding frame, i.e. interframe prediction may be used. It is needless to say that, the above-mentioned predictive coding circuit may be replaced by a code converter circuit using an orthogonal transform e.g. Hadamard Transform or Cosine Transform etc. Further, an orthogonal transform may be applied to a prediction error signal obtained by predictive coding. In such a case, quantization is carried out with respect to a transform coefficient obtained, thus to deliver a quantized conversion coefficient to the variable length coding circuit 30 via the line 2030.

The variable length coding circuit 30 receives the coding control signal 4000, the prediction error signal 2030 (or a conversion coefficient) and a motion vector 2000 and applies code conversion to these signals to carry out a matching between occurrence speed of information and transmission bit rate thereof when transferring them to a transmission path 3000. As previously described, information indicative of occupancy of the buffer memory (304, in FIG. 3A) is supplied to the coding control circuit 40 via a line 3040.

Next, decoding circuitry will be described. A code train which has been subject to code conversion, supplied via the transmission path 3000, is inversely code-converted in a variable length decoding circuit 50. Thus, the code train inversely converted is separated into a coding control signal, a prediction error signal (or a conversion coefficient) and a motion vector. They are outputted from the variable length decoding circuit 50 via lines 5061, 5062 and 5063, respectively. By using these three signals, a predictive decoding circuit 60 is operative to decode/reproduce a picture signal on the basis of an operation inverse to that of the predictive coding circuit 20 and outputs the picture signal via a line 6000. When an orthogonal inverse transform is employed, the predictive decoding circuit 60 would be replaced by the function of orthogonal inverse transform.

The variable length coding circuit 30 and the variable length decoding circuit 50 will be described in detail with reference to FIGS. 3A and 3B.

FIG. 3A illustrates details of the variable length coding circuit 30.

A coding control signal is supplied to an M (mode) coding circuit 300 and an e (error) coding circuit 302 via the line 4000. The operation of the M coding circuit 300 will be described in detail later. An output from the M coding circuit 300 is supplied to a multiplexer (MPX) 303 via a line 3034, and at the same time information indicating that code conversion is completed is fed to a V (vector) coding circuit 301 via a line 3031. Subsequent to this, the V coding circuit 301 is operative to carry out code conversion of a motion vector supplied via the line 2000. The motion vector thus code-converted is supplied to the MPX 303 via a line 3133 and at the same time information indicating that this code conversion is completed is fed to the e coding circuit 302 via a line 3132. In this instance, motion vectors within N scanning lines are collectively subject to code conversion. The motion vectors thus coded are arranged subsequent to the coding mode as indicated by B in FIG. 1. The e coding circuit 302 is operative to apply code conversion to the prediction error signal (or the transform coefficient) supplied via a line 2030 in accordance with a coding mode signal. The code-converted signal is supplied to the MPX 303 via a line 3233 and at the same time information indicating that code conversion is completed is supplied to the M coding circuit 300 via a line 3230. The MPX 303 is operative to multiplex either three signals e.g. the line synchronization, the coding mode signal and the run length as indicated by A in FIG. 1, or four signals e.g. the line synchronization, the coding mode signal, the motion vector and the prediction error code. A multiplexed signal is supplied to the buffer memory 304 and undergoes speed matching, thereafter being outputted to the transmission path 3000. Information indicative of buffer occupancy (indicating what degree the memory capacity is used) of the memory 304 is supplied to the coding control circuit 40.

FIG. 3B shows details of the variable length decoding ciruict 50. A converted code train supplied via the transmission path 3000 first undergoes speed matching in the buffer memory 503. Thereafter, the signal thus obtained is supplied to an M decoding circuit 500, a V decoding circuit 501 and an e decoding circuit 502. The M decoding circuit 500 is operative to decode line synchronization and coding mode, to judge whether there exists a code indicating how many times the same code conversions are repeated per unit of the N scanning lines, and to decode the code when present. In the case where it is judged that the code indicative of the repetition number is included (see code train A in FIG. 1), a decoded coding mode signal is outputted via a line 5061. At the same time, an instruction for repeatedly outputting the same decoded results by a repetition number of decoding operations is supplied to the V decoding circuit 501 and the e decoding circuit 502 via a line 5050. As an example, a coding stop, i.e. a so-called "stop" signal, is given. In such a case, both the motion vector and the prediction error signal are ordinarily expressed as zero. For a time period during which coding is stopped, it is sufficient to output zero.

When a designated number of repetitious operations are completed, and then the decoding operation of the subsequent line synchronization and the coding mode is to be performed (see code train B in FIG. 1), the M decoding circuit 500 instructs the V decoding circuit 501 to initiate the decoding operation of the motion vector via a line 5051. The V decoding circuit 501 is operative to decode a motion vector to output the decoded motion vector via a line 5063. After the delivery of the decoded motion vector is completed, the V decoding circuit 501 instructs the e decoding circuit 502 to initiate the decoding operation of the prediction error signal via a line 5152. The decoded prediction error signal is outputted via a line 5062. It is required to constitute the V decoding circuit 501 and the e decoding circuit 502 so that they repeat delivery of the same outputs under the control of the M decoding circuit 500. Ordinarily, they are configured so that zero can be outputted as previously mentioned. When the decoding operation of the prediction error signal is completed in the e decoding circuit 502, a signal indicative of decoding completion is outputted to the M decoding circuit 500.

The M encoding circuit 300 and the M decoding circuit 500 will be described in detail with reference to FIGS. 4A and 4B.

Figure 4A:
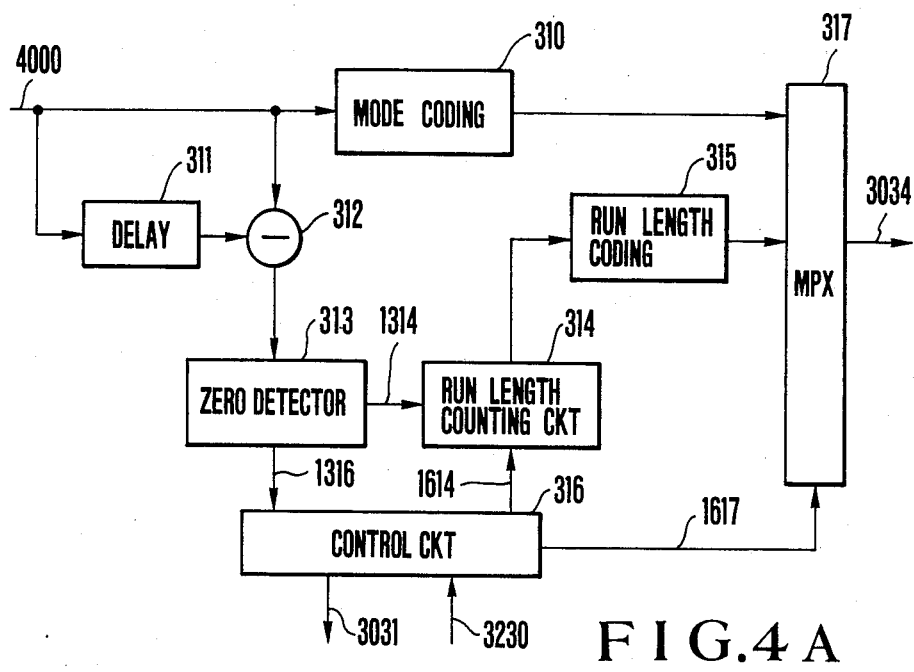
FIG. 4A is a block diagram illustrating the details of an example of a coding mode circuit 300 shown in FIG. 3A.

FIG. 4A illustrates details of the M coding circuit 300. A coding mode signal supplied via the line 4000 is fed to a mode coding circuit 310, a subtractor 312 and a delay circuit 311 at the same time. The mode encoding circuit 310 is operative to add a line synchronization to an input encoding mode signal to effect code conversion thereof, thus to deliver a coded output to a multiplexer (MPX) circuit 317. The subtractor 312 is operative to produce a difference between a current coding mode signal and a coding mode signal delayed by a time required for scanning the N scanning lines. A zero detection circuit 313 is operative to carry out a zero detection, i.e., detect a coincidence based on an output from the subtractor 312. When the zero detection circuit 313 detects zero, it instructs a run length counting circuit 314 to increase a counted value by one via a line 1314, and to transmit information regarding whether zero is present or not to a control circuit 316 via a line 1316. The run length counting circuit 314 counts numbers to be repeated in accordance with a counter start/stop instruction supplied via a line 1614. When the run length counting circuit 314 receives a stop instruction, it delivers a counted result to the run length encoding circuit 315. The run length encoding circuit 315 is operative to execute a code conversion in respect of an input count result to supply it to the MPX circuit 317. The control circuit 316 controls a counting operation of the run length and a multiplexing operation. The control circuit 316 is configured to receive zero or non-zero via the line 1316. When transition from non-zero to zero is carried out, the control circuit 316 instructs the run length counting circuit 314 to initiate counting operation via a line 1614, while when transition from zero to non-zero is carried out, it instructs the circuit 314 to stop the counting operation via the line 1614. The control circuit 316 is operative to control the MPX circuit 317 via a line 1617 in such a manner that during run length counting operation, it does not multiplex an output from the mode coding circuit 310, and only when run length counting operation is completed, it multiplexes an output from the run length encoding circuit 315. Further, when the run length counting operation has been carried out, the control circuit 316 instructs the V coding circuit 301 to initiate coding of a motion vector via a line 3031 after the subsequent mode is outputted. On the other hand, when the run length counting is not carried out, it instructs the V coding circuit 301 to effect the same operation each time the mode code is outputted. During run length counting operation, the V encoding circuit 301 has no output, which corresponds to zero output. The e encoding circuit 302 has no output, which corresponds to zero output since the completion of the code conversion of a motion vector from the V encoding circuit 301 is not instructed during run length counting operation. The control circuit 316 is restarted in response to a signal indicating completion of code conversion of a prediction error signal supplied from the e coding circuit 302 via a line 3230. The line synchronization and the coding mode signal which are multiplexed or the line synchronization, the coding mode signal and a signal indicative of repetition numbers which are multiplexed are fed to the MPX 303 via a line 3034.

Figure 4B:
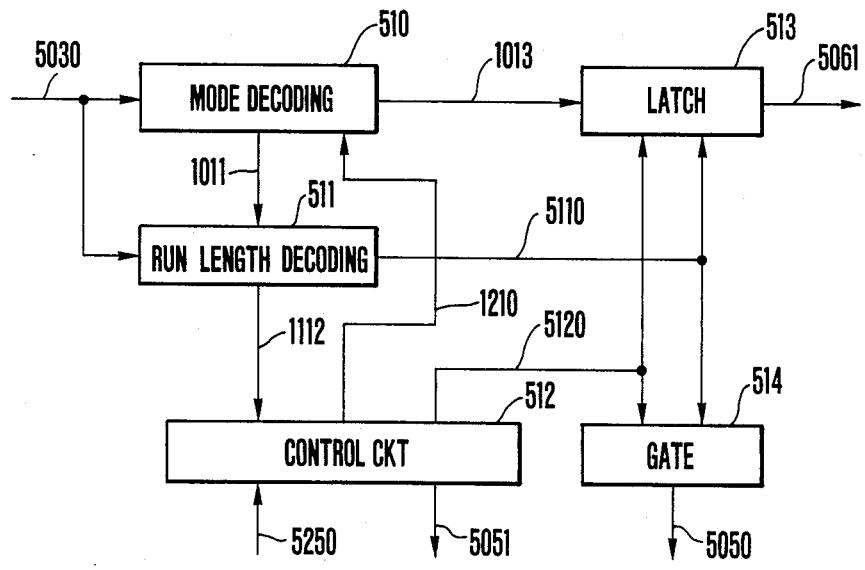
FIG. 4B is a block diagram illustrating the details of an example of a decoding mode circuit 500 shown in FIG. 3B.

FIG. 4B illustrates details of the M decoding circuit 500. An output from the buffer memory 503 supplied via a line 5030 is fed to a mode decoding cirucit 510 and a run length decoding circuit 511. The mode decoding circuit 510 is operative to decode the line synchronization and the coding mode signal to supply a decoded result to a latch circuit 513 via a line 1013. When a code indicative of repetition number is present subsequent to the coding mode signal, the run length decoding circuit 511 is operative to decode the code, thereafter to deliver information indicative of the run length to a control circuit 512 via a line 112. At the same time, the run length decoding circuit 511 instructs the latch circuit 513 to latch the coding mode signal just decoded via a line 5110, and further allows a gate circuit 514 to produce a signal instructing repetitive operations corresponding to a repetition number. A control circuit 512 is operative to count a time corresponding to the repetition number supplied. When the counted time has elapsed, the control circuit 512 instructs the latch circuit 513 to stop a latching operation, and to instruct the gate circuit 514 to stop an output of the signal indicative of repetition number via a line 5120. The control circuit 512 also informs the mode decoding circuit 510 via a line 1210 that repetitive operations are completed and instructs it to execute a decoding operation of the coding mode signal.

When there is no information indicative of run length subsequent to the coding mode signal, the run length decoding circuit 511 does not produce any signals to the latch circuit 513 and the gate circuit 514, and informs the control circuit 512 via a line 1112 that decoding operation of the coding mode signal is completed. At this time, the run length decoding circuit 511 instructs the V decoding circuit 501 to initiate decoding operation of a motion vector via a line 5051. The operation of the control circuit 512 is initiated by a signal indicating that decoding of the prediction error signal supplied via a line 5250 from the e encoding circuit 502 is completed, and is once completed by an instruction to initiate decoding operation of a motion vector with respect to the V decoding circuit 501. A signal indicative of repetition number is ouputted from the gate circuit 514 via a line 5050. When there is no information indicative of repetition, the repetition signal is considered to be inactive signal, which does not affect the V decoding circuit 501 and the e decoding circuit 502. In contrast, when information indicative of repetition is present, the repetition signal is considered to be an active signal, which instructs that both outputs from the V decoding circuit 501 and the e decoding circuit 502 are to be zero.

The code conversion scheme according to the present invention is to encode a repetition number instead of repeating encoding operations one by one when the same coded outputs repeatedly occur. Accordingly, this enables a lesser quantity of information to be required, and when encoding and transmitting a picture signal at a very slow transmission bit rate, this makes it possible to additionally assign a transmission bit rate to encoding of the original picture portion by a reduced quantity, resulting in improvement in picture quality. For this reason, when the present invention is put into practice, it can provide even greater advantages as the transmission rate is lowered. The present invention is applicable not only to the predictive encoding system described as the preferred embodiment but also to an orthogonal transform in the same manner. Accordingly, the present invention can extend fields of applications, providing excellent advantages when applied to practical use.

What is claimed is:

1. A code conversion method for encoding a picture signal using interframe correlation, comprising the steps of:

presetting a number N for defining a unit of N scanning lines (N is a positive integer) of said picture signal to be encoded;

selecting a coding parameter for said picture signal;

encoding every N scanning lines of said picture signal in succession, using said coding parameter;

judging whether an encoded result of a given N scanning lines is the same as an encoded result of an immediately preceding N scanning lines;

producing a coincidence signal when both said encoding results are the same as each other;

encoding a repetition number which is representative of a number of times said coincidence signal is produced; and transmitting said encoded repetition number.

2. An encoder for a picture signal comprising:

(a) code conversion means responsive to successive picture signals correlative with each other to apply a predetermined code conversion based on quantization to each picture signal so as to limit the output level of the picture signal on the basis of a quantization for selecting one of quantization characteristics in accordance with a coding parameter selected using N scanning lines as a unit, (b) first coding means operative to encode information indicative of said coding parameter every N scanning lines, (c) second coding means operative to encode said picture signal outputted from said code conversion means every N scanning lines, (d) judging means provided in said first coding means to judge as to whether an output of said first coding means is the same as that of immediately preceding N scanning lines to produce a coincidence signal when both the outputs are coincident with each other, (e) third coding means, provided in said first coding means, being repsonsive to said coincident signal from said judging means to encode a repetition number of the coding operations every N scanning lines, and (f) multiplexer means operative to multiplex outputs from said first and second coding means or outputs from said first, second and third means depending upon the output status of said judging means.

3. An encoder as set forth in claim 2, wherein said code conversion means comprises a vector detection circuit operative to detect a motion vector from said input picture signal, a prediction coding circuit responsive to said input picture signal and said motion vector from said vector detection circuit to produce a prediction signal so as to effect predictive coding for production of a prediction error signal, thereafter being subject to quantization to select one of quantization characteristics in accordance with a coding control signal fed from a coding cotrol circuit.

4. An encoder as set forth in claim 3, wherein there is provided a variable length coding circuit responsive to said coding control signal, said prediction error signal and said motion vector, said variable length coding circuit including said first and second coding means and said multiplexer means.

5. An encoder as set forth in claim 4, wherein said first coding means comprises mode coding means responsive to said coding control signal to encode said coding control signal with a line synchronization being added thereto, a subtractor operative to calculate a difference between a current coding control signal and a coding control signal delayed by a time required for scanning N lines, a coincidence circuit functioning as said judging means to produce said coincidence signal when it detects zero, a counter responsive to said coincidence signal to make an incremental operation, a coding circuit operative to encode a counted value indicative of repetition number, and a multiplexer operative to multiplex said coding mode signal to which said line synchronization is added and an decoded output indicative of repetition number.

6. An encoder as set forth in claim 5, wherein said first means further comprises a control circuit responsive to said output from said zero detection circuit and a signal indicating that coding operation in said second means is completed to deliver a control signal to said counter and said multiplexer.

7. An encoder as set forth in claim 4, wherein said variable length coding circuit further comprises a coding circuit operative to encode said motion vector from said vector detection circuit, and a buffer memory operative to effect speed matching between a speed of information obtained as a multiplexed output from said multiplexer means and a transmision speed to transmit coded information thus speed-matched and to deliver a signal indicative of buffer occupancy to said coding control means for creating said coding control signal.

8. A decoder for decoding an encoded picture signal using interframe correlation, said decoder being responsive to the picture signal coded so that its output level is limited to a predetermined range in accordance with a coding parameter selected using N scanning lines as a unit, wherein when coding operations with respect to said picture signal, carried out every N scanning lines, have results which are repeated in succession, said coded picture signal includes a coded repetition number of the repeated results of the coding operations, said decoder comprising:

(a) separating means responsive to information indicating said coding parameter, said picture signal and said repetition number of said coding operations, for separating them from each other, (b) first decoding means operative to decode said coding parameter from said separating means, (c) second decoding means operative to decode said coded picture signal from said separating means by using an output from said first decoding means, and (d) control means responsive to said information indicative of said coded repetition number of said coding operations from said separating means, for controlling the decoding operation of said second decoding means according to said repetition number.

9. A decoder as set forth in claim 8, wherein there is provided a variable length decoding circuit for performing functions of said separating means, said first an second decoding means, and said control means.

10. A decoder as set forth in claim 9, wherein said variable length decoding circuit includes a first decoding circuit operative to decode said coding parameter and said information indicative of repetition number of said coding operations.

11. A decoder for decoding an encoded picture signal, said decoder being responsive the picture signal coded so that its output level is limited to a predetermined range in accordance with a coding parameter selected using N scanning lines as a unit, wherein when coding operations with respect to said picture signal, carried out every N scanning lines, have results which are repeated in succession, said coded picture signal includes information indicative of a coded repetition number of the repeated results of the coding operations, said decoder comprising:

(a) separating means responsive to information indicating said coding parameter, said picture signal and said repetition number of said coding operations, for separating them from each other, (b) first decoding means operpative to decode said coding parameter from said separating means, (c) second decoding means operative to decode said coded picture signal from said separating means by using an output from said first decoding means, and (d) control means responsive to said information indicative of said coded repetition number of said coding operations from said separating means, for controlling the decoding operation of said second decoding mans according to such repetition number;

wherein there is provided a variable length decoding circuit for performing functions of said separating means, said first and second decoding means, and said control means;

wherein said variable length decoding circuit includes a first decoding circuit operative to decode said coding parameter and said information indicative of said repetition number of said coding operations; and wherein when said picture signal is decoded based on a predictive coding system, said variable length decoding circuit further comprises a second decoding circuit operative to decode a coded prediction error signal, and a third decoding circuit operative to decode a coded motion vector.

12. A decoder as set forth in claim 11, wherein said variable length decoding circuit further comprises a buffer memory for transmission speed matching provided at the preceding stage thereof.

13. A decoder as set forth in claim 12, wherein said first decoding circuit comprises a mode decoding circuit operative to decode said coding mode signal, a latch circuit for latching said decoded coding mode signal, a decoder operative to decode said information indicative of repetition number to allow said latch circuit to latch said decoded coding mode signal, and a control circuit responsive to coded information indicative of repetition number from said detector and a signal indicating that decoding operation is completed from said second decoding circuit to output a command for stopping latch operation to said latch circuit, to output a command for stopping repetitive operation to said third decoding circuit and to output a command for initiating decoding operation to said mode decoding circuit.

* * * * *